United States Patent
Penner et al.

(10) Patent No.: US 8,473,571 B2
(45) Date of Patent: Jun. 25, 2013

(54) SYNCHRONIZING PRESENTATION STATES BETWEEN MULTIPLE APPLICATIONS

(75) Inventors: Nathan Robert Penner, Mountain View, CA (US); Sharad Kumar Garg, Banjara Hills Hyderabad (IN); Aditya Kumar, Sunnyvale, CA (US); Gideon Goodwin, Mountain View, CA (US)

(73) Assignee: Microsoft Corporation, Redmond, WA (US)

(*) Notice: Subject to any disclaimer, the term of this patent is extended or adjusted under 35 U.S.C. 154(b) by 755 days.

(21) Appl. No.: 12/350,245

(22) Filed: Jan. 8, 2009

(65) Prior Publication Data

US 2010/0174773 A1    Jul. 8, 2010

(51) Int. Cl.
     *G06F 15/16*     (2006.01)
     *G06F 12/00*     (2006.01)

(52) U.S. Cl.
     USPC ........................................ 709/217; 709/218

(58) Field of Classification Search
     USPC ................. 709/217–218, 223–229, 250, 231
     See application file for complete search history.

(56) References Cited

U.S. PATENT DOCUMENTS

| | | | |
|---|---|---|---|
| 6,108,687 A | 8/2000 | Craig | |
| 6,654,785 B1 | 11/2003 | Craig | |
| 6,728,753 B1 | 4/2004 | Parasnis et al. | |
| 6,760,749 B1 | 7/2004 | Dunlap et al. | |
| 6,850,967 B1 | 2/2005 | Spencer et al. | |
| 7,003,550 B1 | 2/2006 | Cleasby et al. | |
| 7,403,969 B2 | 7/2008 | White | |
| 7,412,533 B1 | 8/2008 | Johnson et al. | |
| 7,620,899 B2 * | 11/2009 | Abdo et al. | 715/740 |
| 2005/0039133 A1 * | 2/2005 | Wells et al. | 715/740 |
| 2005/0151850 A1 | 7/2005 | Ahn et al. | |
| 2006/0041686 A1 * | 2/2006 | Caspi et al. | 709/248 |
| 2006/0041687 A1 * | 2/2006 | Caspi et al. | 709/248 |
| 2006/0174312 A1 * | 8/2006 | Ducheneaut et al. | 725/135 |
| 2006/0235927 A1 | 10/2006 | Bhakta et al. | |
| 2007/0226625 A1 * | 9/2007 | Cardone et al. | 715/732 |
| 2008/0134211 A1 | 6/2008 | Cui | |
| 2010/0169951 A1 * | 7/2010 | Vaughan et al. | 726/3 |

FOREIGN PATENT DOCUMENTS

WO      2004109498 A1     12/2004

OTHER PUBLICATIONS

Ma, et al., "T-Cube: A Multimedia Authoring System for eLearning", retrieved at <<http://www.mpi-inf.mpg.de/~tongbo/publication/elearn03.pdf>> In Proceedings of E-Learn 2003, Nov. 7-11, 2003, pp. 2289-2296.

(Continued)

*Primary Examiner* — Zarni Maung
(74) *Attorney, Agent, or Firm* — Merchant & Gould PC

(57) ABSTRACT

A presentation state is received from the presenting application. The presentation state may represent a current state of the local presentation. A request for the presentation state is received from the viewing application. In response to receiving the request for the presentation state, the presentation state is provided to the viewing application. A request for presentation data synchronized to the presentation state is received from the viewing application. In response to receiving the request for presentation data synchronized to the presentation state, the presentation file is transformed into the presentation data synchronized to the presentation state. The presentation data synchronized to the presentation state is provided to the viewing application. The viewing application may be operative to read the presentation data and to display a remote presentation in response to reading the presentation data.

21 Claims, 16 Drawing Sheets

OTHER PUBLICATIONS

Zhang, et al., "A Presentation Authoring Tool for Media Devices Distributed Environments", retrieved at <<http://www.fxpal.com/publications/FXPAL-PR-04-277.pdf>> pp. 4.

"International Search Report", May 26, 2010, Application No. PCT/US2009/066619, Filed Date Dec. 3, 2009, pp. 12.

KR 10-2007-0096806 A, in the name of International Business Machines Corporation, published Oct. 2, 2007, Abstract only.

KR 10-2000-0059516 A, in the name of Young Hwan Lim, published Oct. 5, 2000, Abstract only.

European supplemental search report mailed Feb. 7, 2013, in Application No. 09837804 (6 pages).

* cited by examiner

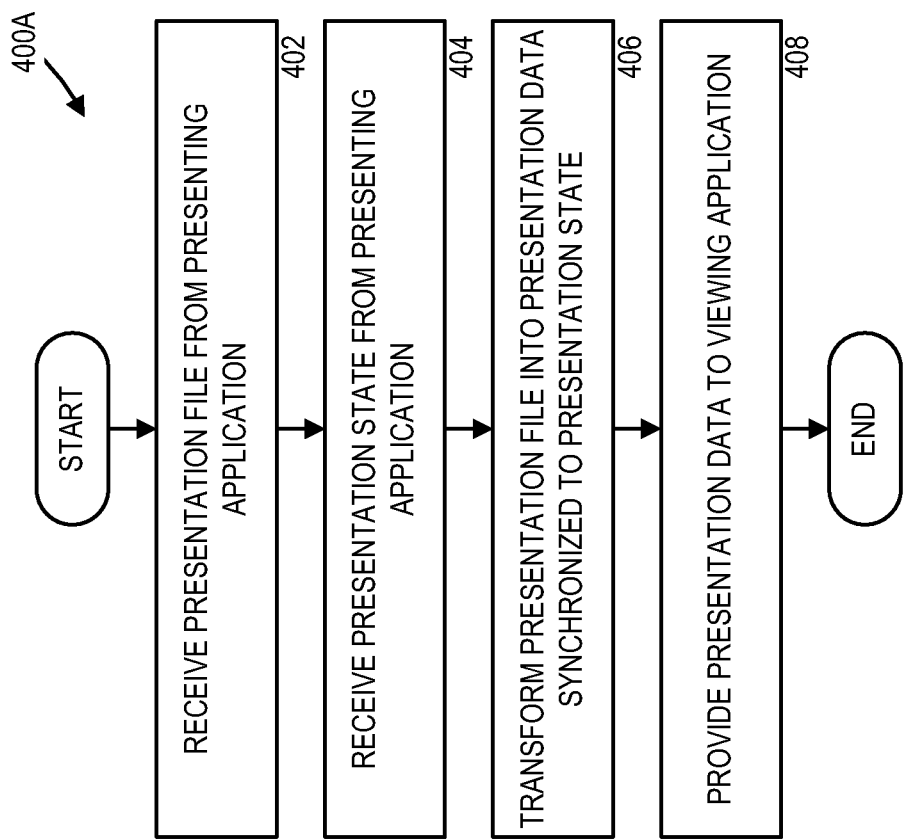

SYNCHRONIZING PRESENTATION STATES BETWEEN MULTIPLE APPLICATIONS

BACKGROUND

Presentation programs are computer applications that display information, commonly in the form of slides. Presentation programs may include an editor for creating slides and a slide-show system for presenting the slides. Examples of presentation programs include, but are not limited to, POWERPOINT from MICROSOFT CORPORATION, and KEYNOTE from APPLE INC.

Presentation programs have been designed primarily as a tool for giving a presentation to a live audience in the same room as the presenter. For example, a computer executing the presentation program may be coupled to a large display device or a video projector. More and more frequently, however, attendees who cannot be physically present at the live location may need to view the presentation. For these remote attendees, existing solutions are generally not ideal in light of the limitations of conventional presentation programs. In a first option, the remote attendees may travel to the live presentation site. This option introduces travel costs and limits the number of possible attendees to only those who can attend the live presentation.

In a second option, the remote attendees may listen to the presentation over a telephone, either without the slides or by following a copy of the slides. In this option, the remote attendees cannot see the presenter's transitions between slides or the presenter's live actions, such as the presenter's use of a laser pointer and a mouse pointer or the presenter's real-time drawings and annotations made during the presentation. Further, the remote attendees may not be able to view animations and other multimedia. This is particularly true if the remote attendees merely have a paper copy of the slides.

In a third option, the remote attendees may utilize an existing broadcast application, which may be difficult to set up and use and may have limited functionality. In many instances, the broadcasting application is entirely different from and may not be fully compatible with the presentation program. For example, some of the functionality utilized by the presenter through the presentation program may not be broadcasted through the broadcast application. Further, if the presenter is unfamiliar with the broadcast application, the presenter may need to set up the remote presentation in advance, thereby preventing any last-minute changes to the presentation content.

It is with respect to these considerations and others that the disclosure made herein is presented.

SUMMARY

Technologies are described herein for synchronizing presentation states between multiple applications. In particular, a state service and a viewing service are provided. The state service may be operative to provide a presentation state corresponding to an actual presentation given through a local device. The viewing service may be operative to render a presentation file for remote viewing through a remote device. Through the state service and the viewing service, a presentation can be provided at the remote device that matches the presentation displayed at the local device.

According to one embodiment presented herein, a method is provided for synchronizing a presentation state between a presenting application executing on a presenter device and a viewing application executing on an attendee device. A presentation state is received from the presenting application. The presenting application may be operative to read a presentation file and to display a local presentation in response to reading the presentation file. The presentation state may represent a current state of the local presentation. A request for the presentation state is received from the viewing application. In response to receiving the request for the presentation state, the presentation state is provided to the viewing application. A request for presentation data synchronized to the presentation state is received from the viewing application. In response to receiving the request for presentation data synchronized to the presentation state, the presentation file is transformed into the presentation data synchronized to the presentation state. The presentation data synchronized to the presentation state is provided to the viewing application. The viewing application may be operative to read the presentation data and to display a remote presentation in response to reading the presentation data.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 4A and 4B are flow diagrams showing illustrative processes for synchronizing presentation states between multiple applications.

DETAILED DESCRIPTION

The following detailed description is directed to technologies for synchronizing presentation states between a presenting computer application (hereinafter referred to as "presenting application") and one or more viewing computer applications (hereinafter referred to as "viewing applications"). Through the utilization of the technologies and concepts presented herein, a presenter may utilize the presenting application to broadcast a presentation through a viewing service, which is operative to render the presentation for remote viewing through the viewing applications.

While the presenter is giving the presentation, the presenting application may update a state service to reflect changes to the presentation state. A remote attendee may connect a viewing application to the viewing service and the state service in order to view the presentation. In one embodiment, the viewing application requests from the state service a presentation state. The viewing application then requests from the viewing service presentation data corresponding to the presentation state. Upon receiving the presentation data from the viewing service, the viewing application displays the presentation data for the attendee. In another embodiment, while the attendee is viewing the presentation, the viewing service periodically retrieves the presentation state from the state service. The viewing service then synchronizes its rendering of the presentation to the actual presentation given by the presenter as specified by the presentation state.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
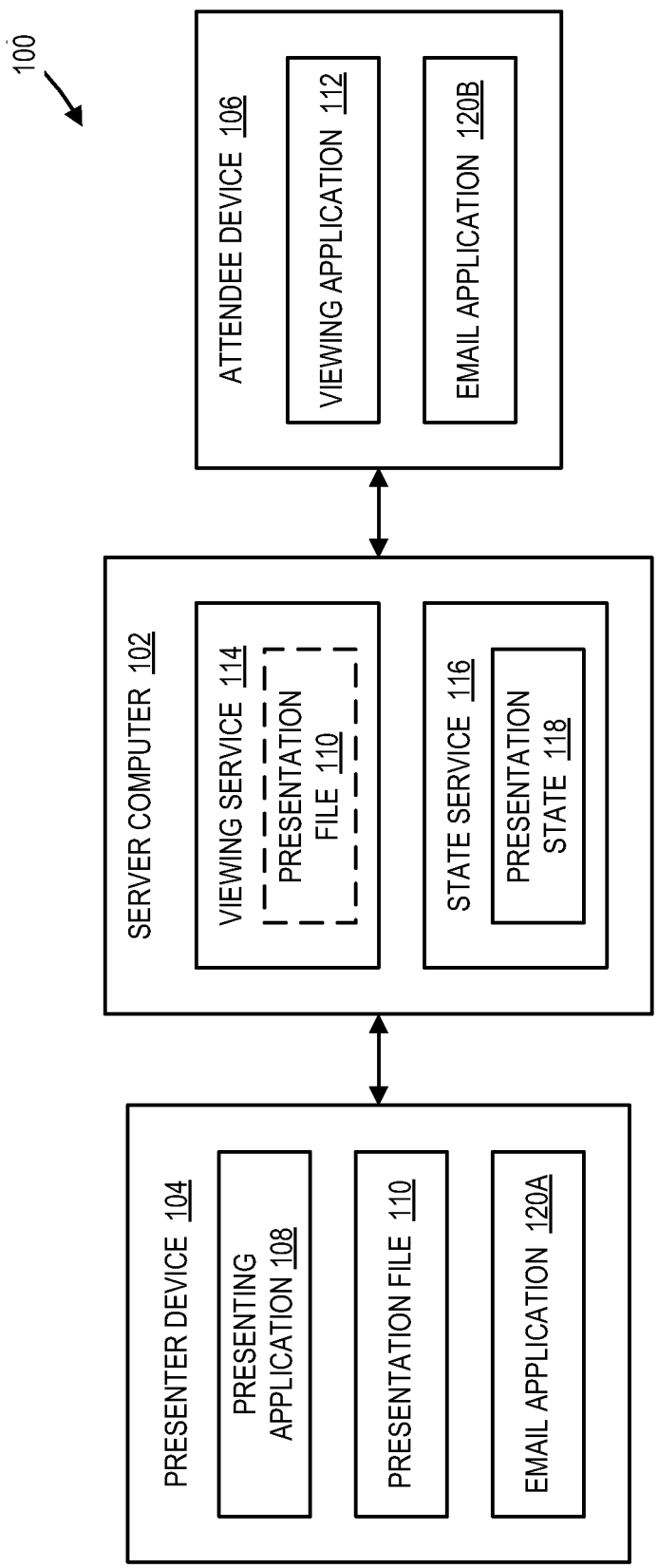
FIG. 1 is a network architecture diagram showing a network architecture capable of displaying a remote presentation synchronized with a local presentation.

In the following detailed description, references are made to the accompanying drawings that form a part hereof, and which are shown by way of illustration specific embodiments or examples. Referring now to the drawings, in which like numerals represent like elements through the several figures, a computing system and methodology for providing a remote presentation will be described. In particular, FIG. 1 illustrates a simplified network architecture 100 including a server computer 102, a presenter device 104, and an attendee device 106 coupled via a suitable communications network (not shown). The network may be any suitable network, such as a local area network ("LAN") or the Internet. In one embodiment, the network is a private network, such as an enterprise network. Although only one attendee device 106 is illustrated in FIG. 1, the network architecture 100 may include multiple attendee devices coupled to the to the server computer 102 in any suitable network configuration.

The presenter device 104 includes a presenting application 108 and a presentation file 110. The presentation file 110 stores a presentation (e.g., a series of slides) in a format readable by the presenting application 108. The presenting application 108 is operative to read the presentation file 110 and to display the corresponding presentation. The attendee device 106 is configured to store a viewing application 112 for remotely viewing the presentation. In one embodiment, the presenting application 108 is a presentation program, and the viewing application 112 is a web browser. In other embodiments, the presenting application 108 and the viewing application 112 each may be a desktop presentation program, a mobile presentation program, or a web browser.

The server computer 102 includes a viewing service 114 and a state service 116. The viewing service 114 is operative to render the presentation file 110 into a format enabling the viewing application 112 to display the presentation on the attendee device 106. For example, the viewing service 114 may be operative to render the presentation file 110 in a presentation program format into a format readable by a web browser. As used herein, the term "presentation data" refers to the output of the viewing service 114 upon rendering at least a portion of the presentation file 110. The viewing application 112 may access the presentation data created by the viewing service 114 via a uniform resource locator ("URL").

Although only one viewing service 114 is illustrated in FIG. 1, it should be appreciated that the server computer 102 may include any suitable number of viewing services. In particular, the multiple viewing services may be utilized to render the presentation file into different formats readable by different viewing applications. For example, while one viewing service is operative to render a presentation file into a format readable by a web browser, another viewing service may be operative to render the presentation file into a format readable by a mobile presentation program executing on a mobile device. Further, although only one presenting application 108, one presentation file 110, and one presenter device 104 are shown, it should further be appreciated that any number of presenting applications, presentation files, and presenter devices may be similarly utilized.

The state service 116 is operative to store a presentation state 118 that reflects a current state of the presentation being displayed through one or more presenting applications, such as the presenting application 108. The state service 116 also store other relevant information about the presentation, such as a session identifier ("ID"), an ID for the presentation file 110, an ID for the presenter, and a list of attendees viewing the presentation. In one embodiment, the presenting application 108 updates the presentation state 118 each time the state of the presentation changes. Examples of a change to the state of the presentation include, but are not limited to, a transition of one slide to another, the color, shape, and movement of a laser pointer, the color, shape, and movement of a mouse pointer, and the output/display of audio, video, animations, and other multimedia. Examples of the presentation state 118 include, but are not limited to, the current slide number, the current animation step, and relevant information about a laser or mouse pointer (e.g., recent coordinates traversed by the pointer, the color of the pointer, the shape of the pointer). The session ID may identify a particular presentation being shown if multiple presentations are given. For example, multiple presentations may be provided by a single presenter or multiple presenters operating one or more presenting applications on one or more presenter devices.

In one embodiment, the viewing application 112 communicates with both the viewing service 114 and the state service 116. In particular, the viewing application 112 may request from the state service 116 the presentation state 118. The viewing application 112 may then retrieve from the viewing service 114 the presentation data corresponding to the presentation state 118. That is, the viewing application 112 may retrieve the relevant presentation data synchronized with the presentation displayed through the presenter device 104. Upon receiving the presentation data, the viewing application 112 may read the presentation data and display the corresponding remote presentation.

For example, the presentation state 118 may indicate that the presenting application 108 is currently displaying slide number five and that a laser pointer image is shown at coordinates (10, 20). In this case, the presentation state 118 may retrieve the presentation data corresponding to the slide number five and the laser pointer image at coordinates (10, 20). In this way, the presenting application 108 displays the slide number five and the laser pointer image at coordinates (10, 20) as rendered by the viewing service.

In another embodiment, the viewing application 112 communicates with the viewing service 114, which communicates with the state service 116. In particular, the viewing service 114 may retrieve the presentation state 118 from the state service 116 at periodic intervals. Upon retrieving the presentation state 118 from the state service 116, the viewing service 114 may synchronize its rendering of the presentation to the actual presentation given by the presenter as specified by the presentation state 118. In this way, the presentation displayed through the attendee device 106 may match or more closely match the presentation displayed through presenter device 104, even if the viewing application 112 is entirely different from the presenting application 108 and/or incompatible with the presentation file 110.

In an illustrative implementation of the network architecture 100, a presenter operating the presenter device 104 opens the presentation file 110. Upon opening the presentation file 110, the presenter may select an option on the presenting application 108 to broadcast the presentation associated with the presentation file 110. The presenter also selects through the presenting application 108 a server computer, such as the server computer 102, to host the presentation. The presenting application 108 then uploads the presentation file 110 to the server computer 102, as indicated by the dotted line in FIG. 1.

The viewing service 114 generates a URL enabling the viewing application 112 to remotely access the presentation as rendered by the viewing service 114. The presenter may then open a first electronic ("email") application 120A or other suitable communication application (e.g., a chat application, a text messaging application) in order to forward the URL to an attendee operating the attendee device 106. The attendee may receive an email containing the URL at a second email application 120B. Upon receiving the email at the second email application 120B, the attendee may open the URL through the viewing application 112 in order to access the presentation rendered by the viewing service 114.

At some point after the presenter forwards the URL to the attendee, the presenter may initiate the presentation. When the presenter initiates the presentation, the presenting application 108 transmits to the viewing service 114 an indication that the presentation has started. The start of the presentation may represent an initial presentation state. As the presentation progresses, the presenter may transition from the initial presentation state into additional presentation states, such as the presentation state 118, by transitioning between slides, playing various embedded multimedia, and utilizing a laser or mouse pointer to direct attendees to specific portions of the slides. During the presentation, the presenting application 108 may update the presentation state 118 when the state of the presentation changes.

In one embodiment, the viewing application 112 retrieves the presentation state 118 from the state service 116. The viewing application 112 may then retrieve the presentation data corresponding to the state service 116. In another embodiment, the viewing service 114 periodically retrieves the presentation state 118 from the state service 116. The viewing service 114 may then synchronize its rendering of the presentation to the actual presentation given by the presenter as specified by the presentation state 118. In both embodiments, the presentation displayed to the attendee through the attendee device 106 is at least substantially similar to the presentation displayed to live participants through the presenter device 104.

Turning now to FIGS. 2A-2H, an illustrative implementation of the presenting application 108 is shown in the form of a plurality of screen display diagrams 200A-200H. In particular, the screen display diagrams 200A-200H show an illustrative sequence of presenter actions whereby the presenter can broadcast a given presentation for an attendee to access through the viewing application 112. It should be appreciated that FIGS. 2A-2H merely show one example of the presenting application 108 and are not intended to be limiting.

Figure 2A:
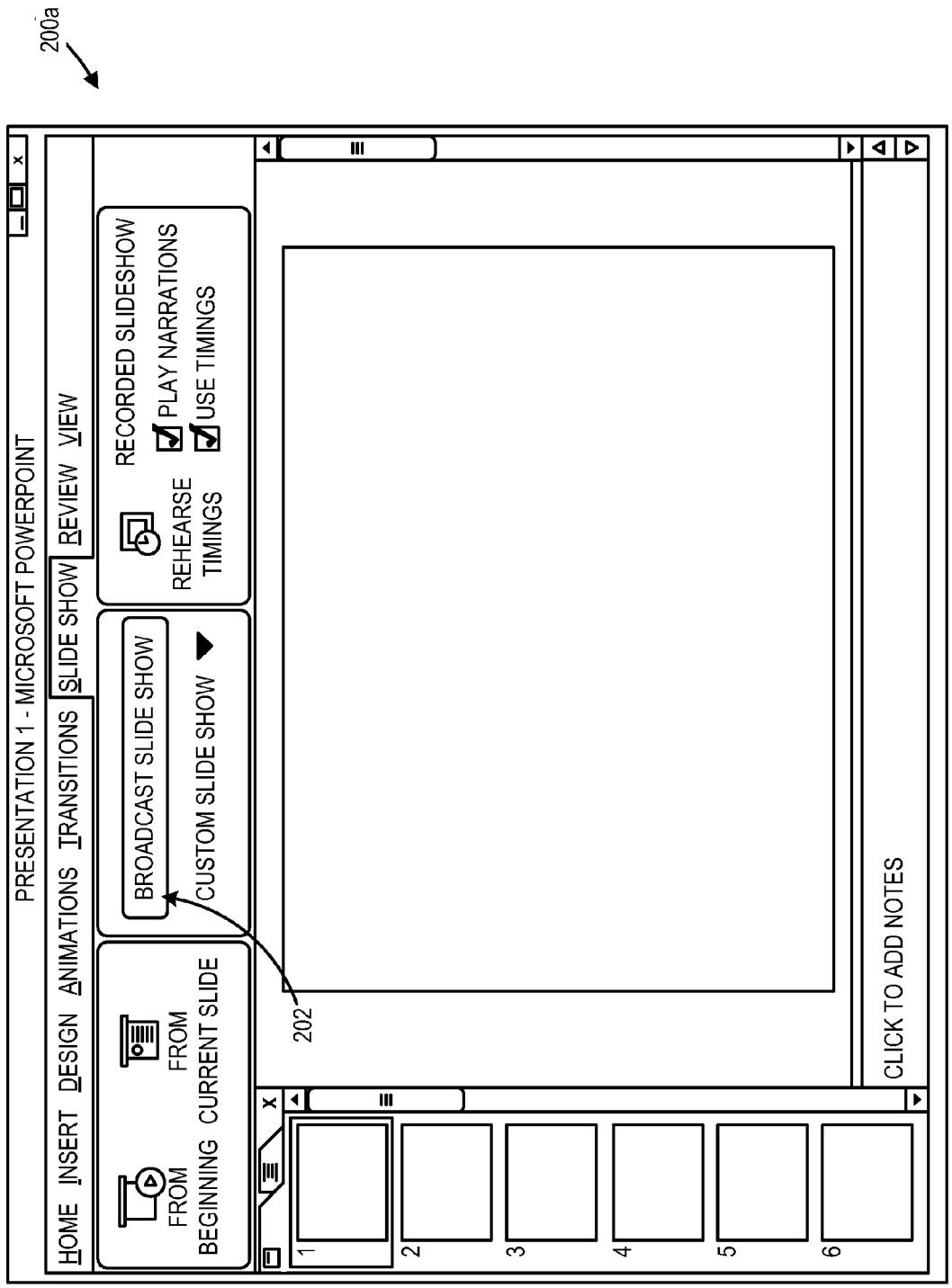
FIGS. 2A-2H are screen display diagrams showing an illustrative implementation of a presenting application.

FIG. 2A shows the illustrative screen display diagram 200A of the presenting application 108 prior to the presenter initiating a broadcast of a presentation. In FIG. 2A, the presenter has previously opened the presentation file 110 through the presenting application 108. In one embodiment, the presenting application 108 includes a presentation broadcast button 202 or other suitable interface element. The presenter may depress the presentation broadcast button 202 using a mouse or other suitable input device, causing a transition from the screen display diagram 200A to the screen display diagram 200B.

Figure 2B:
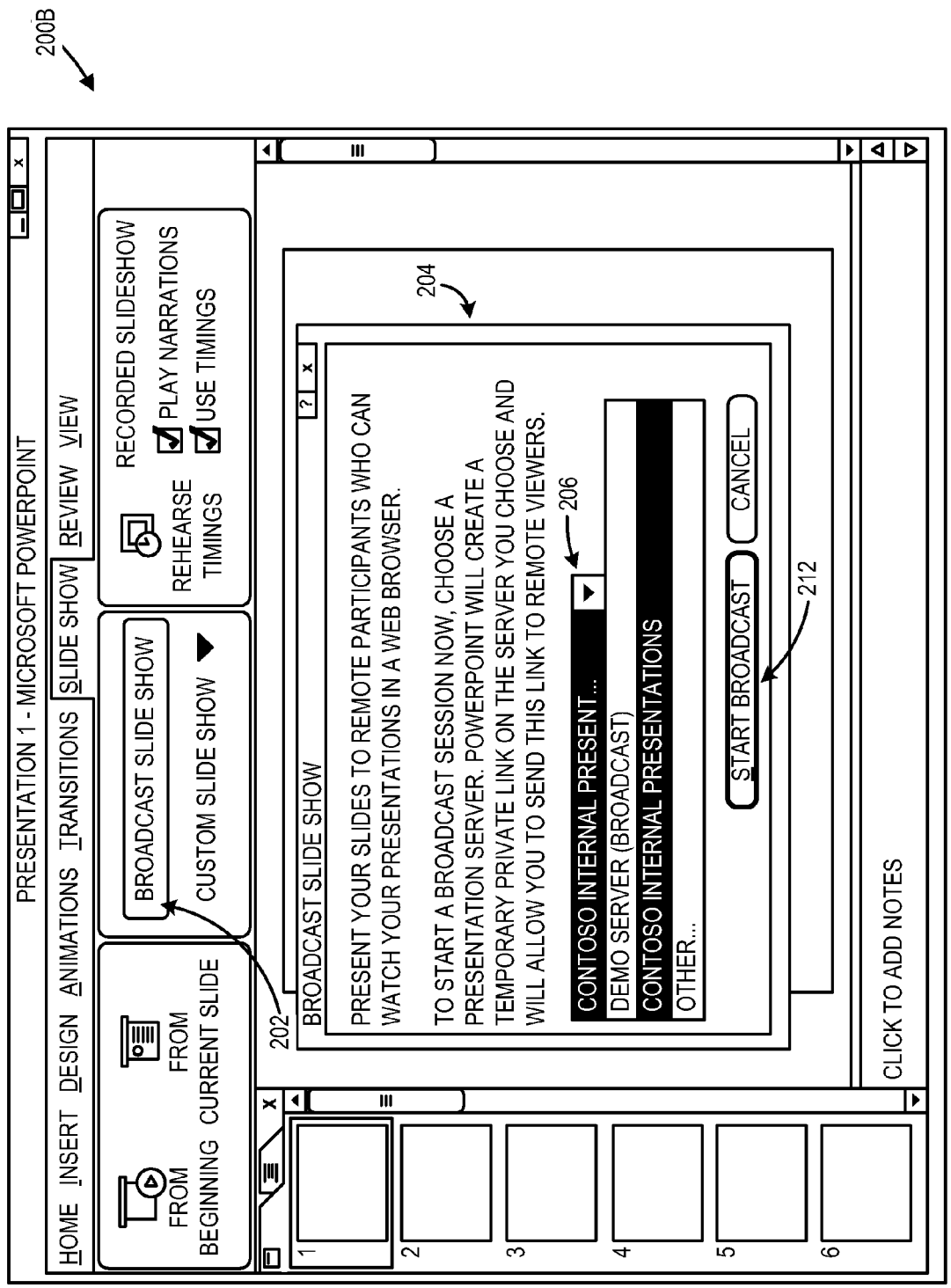

FIG. 2B shows the illustrative screen display diagram 200B of the presenting application 108 after the presenter depresses the presentation broadcast button 202. Upon receiving a selection of the presentation broadcast button 202, the presenting application 108 displays a broadcast interface 204 with which the presenter can select a server computer, such as the server computer 102, to host the presentation. As illustrated in FIG. 2B, the broadcast interface 204 includes a server selection menu 206 implemented as a drop-down menu. Other types of selection menus may be similarly utilized. Once the appropriate server computer has been selected from the server selection menu 206, the screen display diagram 200B transitions to the screen display diagram 200C.

Figure 2C:
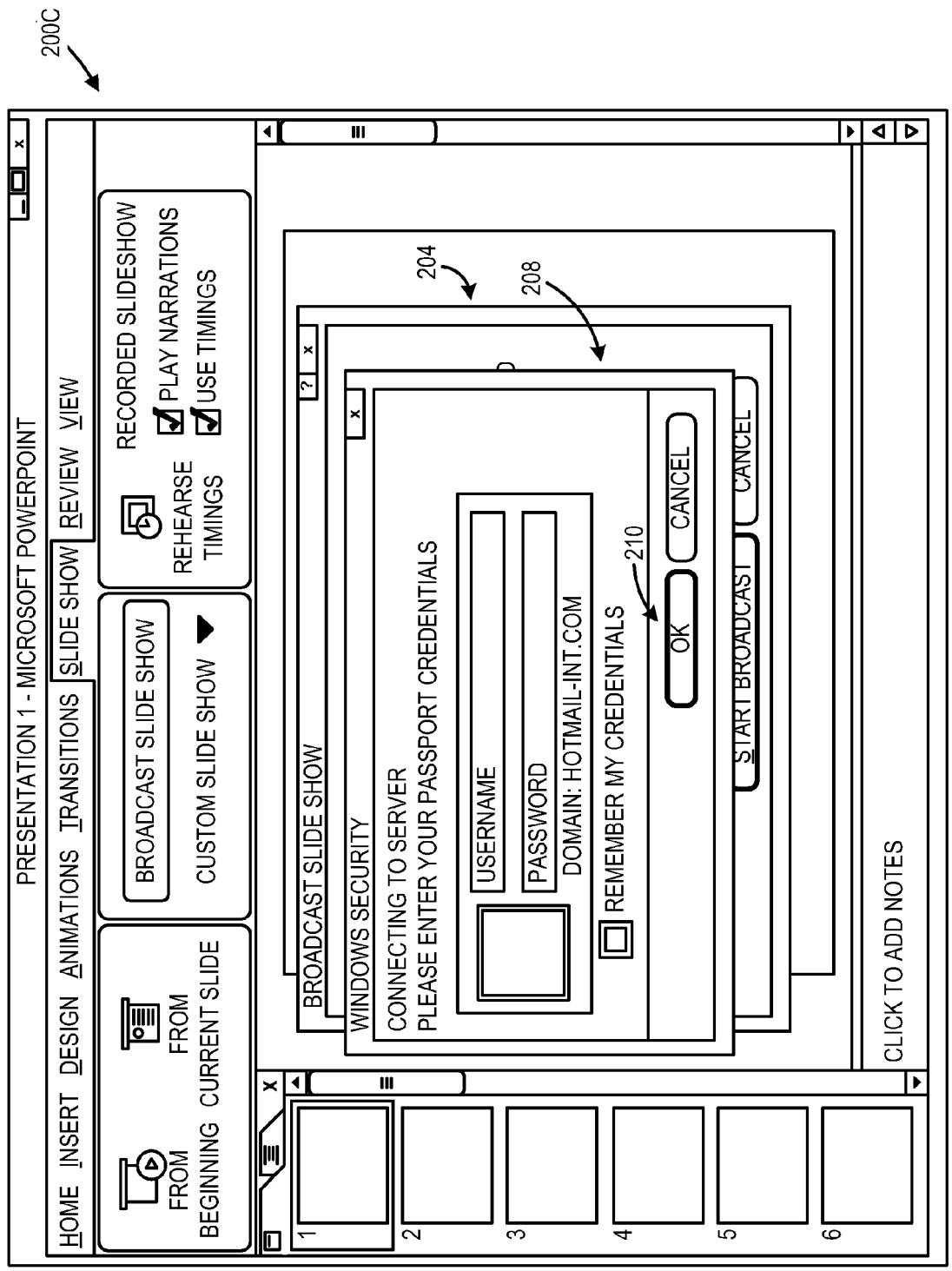

FIG. 2C shows the illustrative screen display diagram 200C of the presenting application 108 after the presenter selects a server computer from the server selection menu 206. Upon receiving a selection of the server computer, the presenting application 108 displays an authentication interface 208 in which the presenter can a login identifier ("ID") and password for accessing the selected server computer. It should be appreciated that that the selection of other servers may or may not require authentication. Upon entering the login ID and password, the presenter may depress a submit button 210, causing a transition from the screen display diagram 200C back to the screen display diagram 200B as shown in FIG. 2B. Referring again to screen display diagram 200B of FIG. 2B, the presenter may depress a presentation upload button 212, causing a transition from the screen display diagram 200C to the screen display diagram 200D.

Figure 2D:
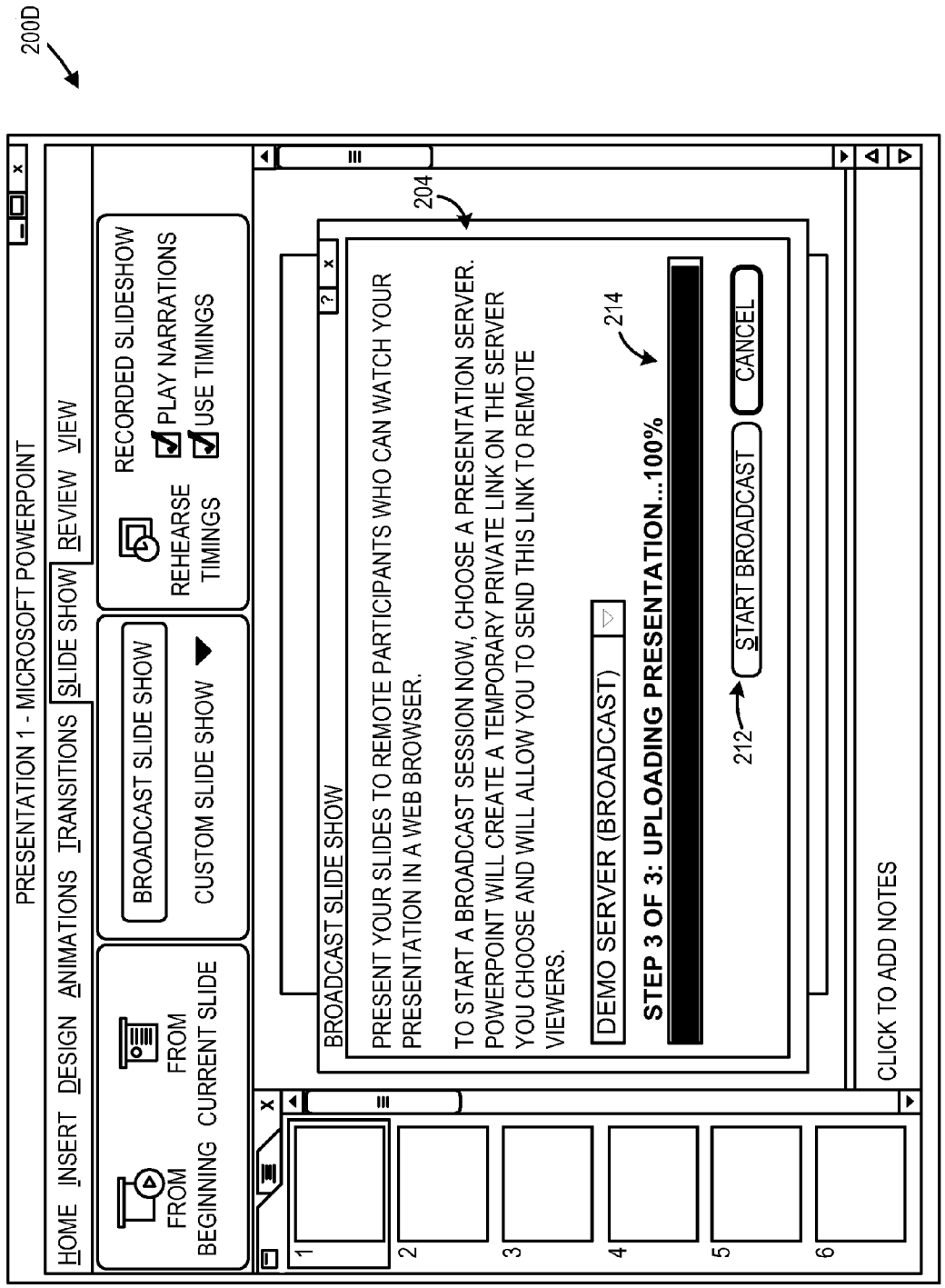

FIG. 2D shows the illustrative screen display diagram 200D of the presenting application 108 after the presenter depresses the presentation upload button 212. Upon receiving a selection of the presentation upload button 212, the presenting application 108 displays, within the broadcast interface 204, an upload status bar 214. The upload status bar 214 is operative to display the amount of the presentation file 110 that has been uploaded from the presenter device 104 to the server computer 102. As illustrated in FIG. 2D, the upload status bar 214 has reached 100%, indicating that the presentation file 110 has been completely uploaded to the server computer 102. Once the presentation file 110 is uploaded to the server computer 102, the screen display diagram 200D transitions to the screen display diagram 200E.

Figure 2E:
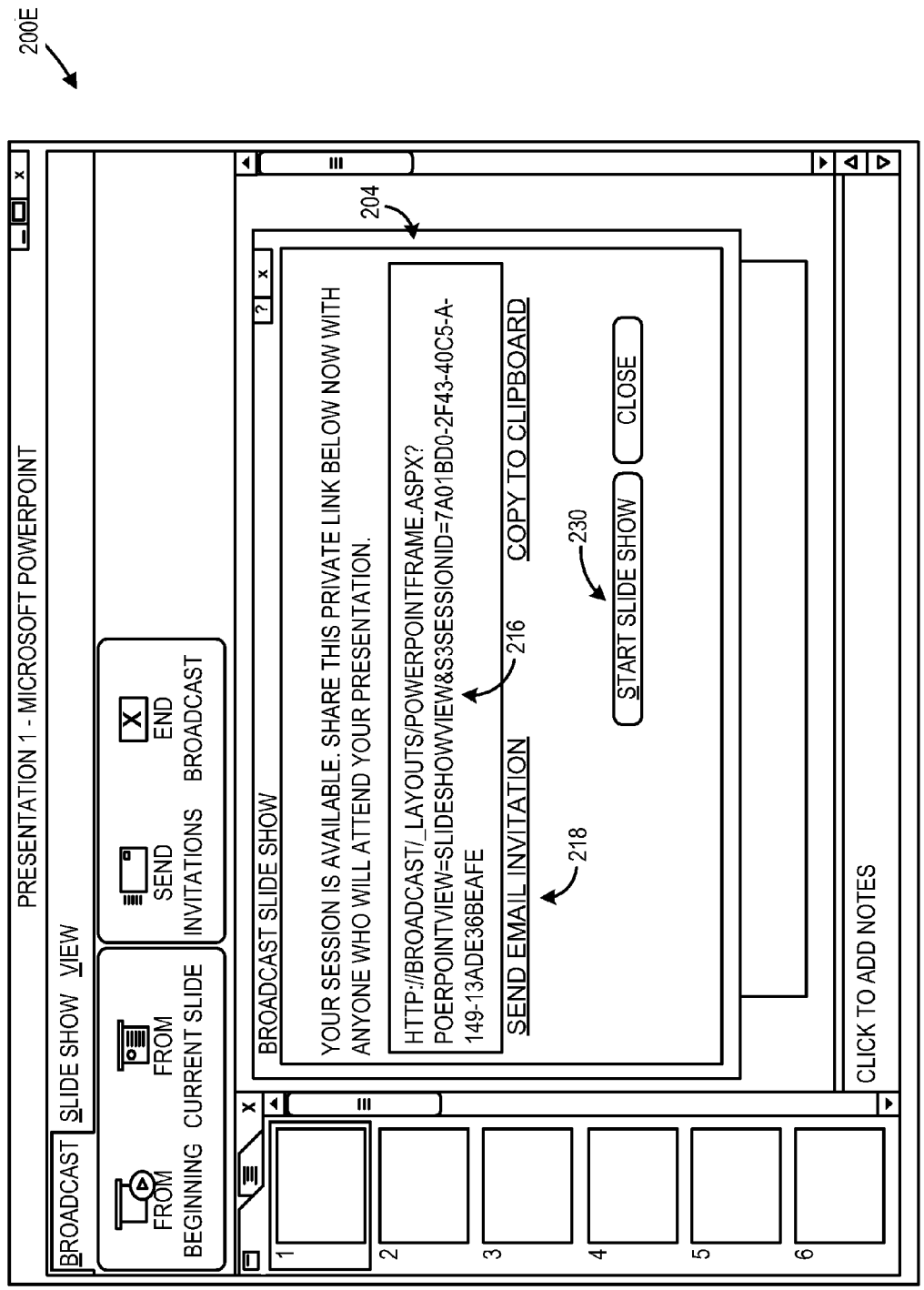

FIG. 2E shows the illustrative screen display diagram 200E of the presenting application 108 after the presentation file 110 has been uploaded to the server computer 102. Upon uploading the presentation file 110 to the server computer 102, the presenting application 108 creates a URL 216 for remotely accessing the presentation as rendered by the viewing service 114. As illustrated in FIG. 2E, the presenting application 108 displays the URL 216 within the broadcast interface 204. Further, the presenting application 108 includes an email invitation option 218 for opening the first email application 120A and enabling the presenter to email the URL 216 to appropriate attendees. In other embodiments, the presenting application 108 may include other suitable options, such as an option to open a chat interface or a text messaging interface, for sharing the URL 216. In the example shown in FIG. 2E, the presenter selects the email invitation option 218, causing a transition from the screen display diagram 200E to the screen display diagram 200F.

Figure 2F:
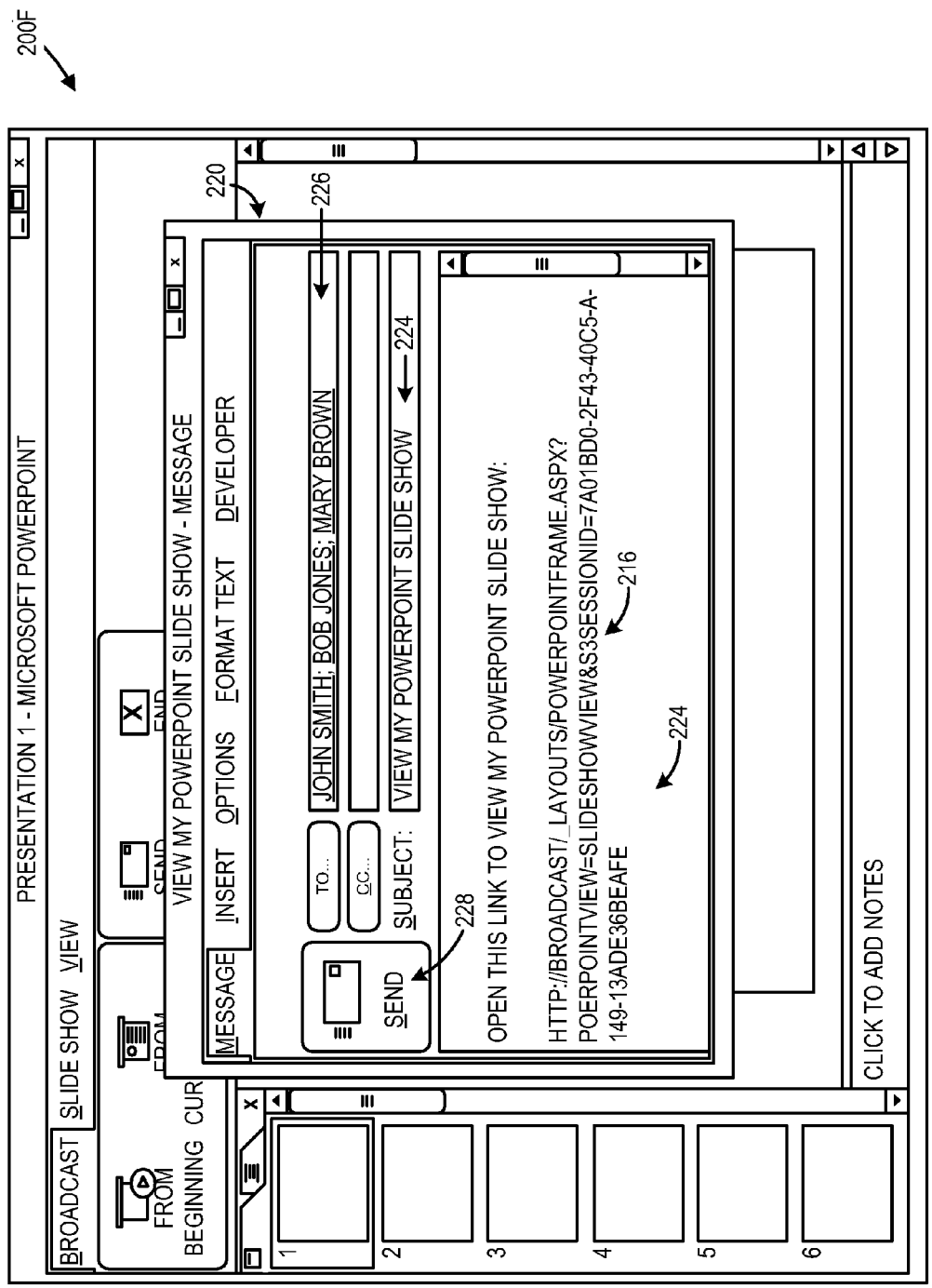

FIG. 2F shows the illustrative screen display diagram 200F of the presenting application 108 after the presenter selects the email invitation option 218. Upon receiving a selection of the email invitation option 218, the presenting application 108 initiates the first email application 120A, which displays a send email interface 220 for forwarding the URL 216 to appropriate attendees. In one embodiment, the send email interface 220 inserts a subject line 222 and the URL 216 into an email 224. In this case, the presenter can enter email addresses 226 of the appropriate attendees and depress a send button 228 to send the email 224. Upon sending the email 224, the screen display diagram 200F transitions back to the screen display diagram 200E of FIG. 2E. Referring again to the screen display diagram 200E of FIG. 2E, the presenter may depress a start presentation button 230, causing a transition from the screen display diagram 200E to the screen display diagram 200G.

Figure 2G:
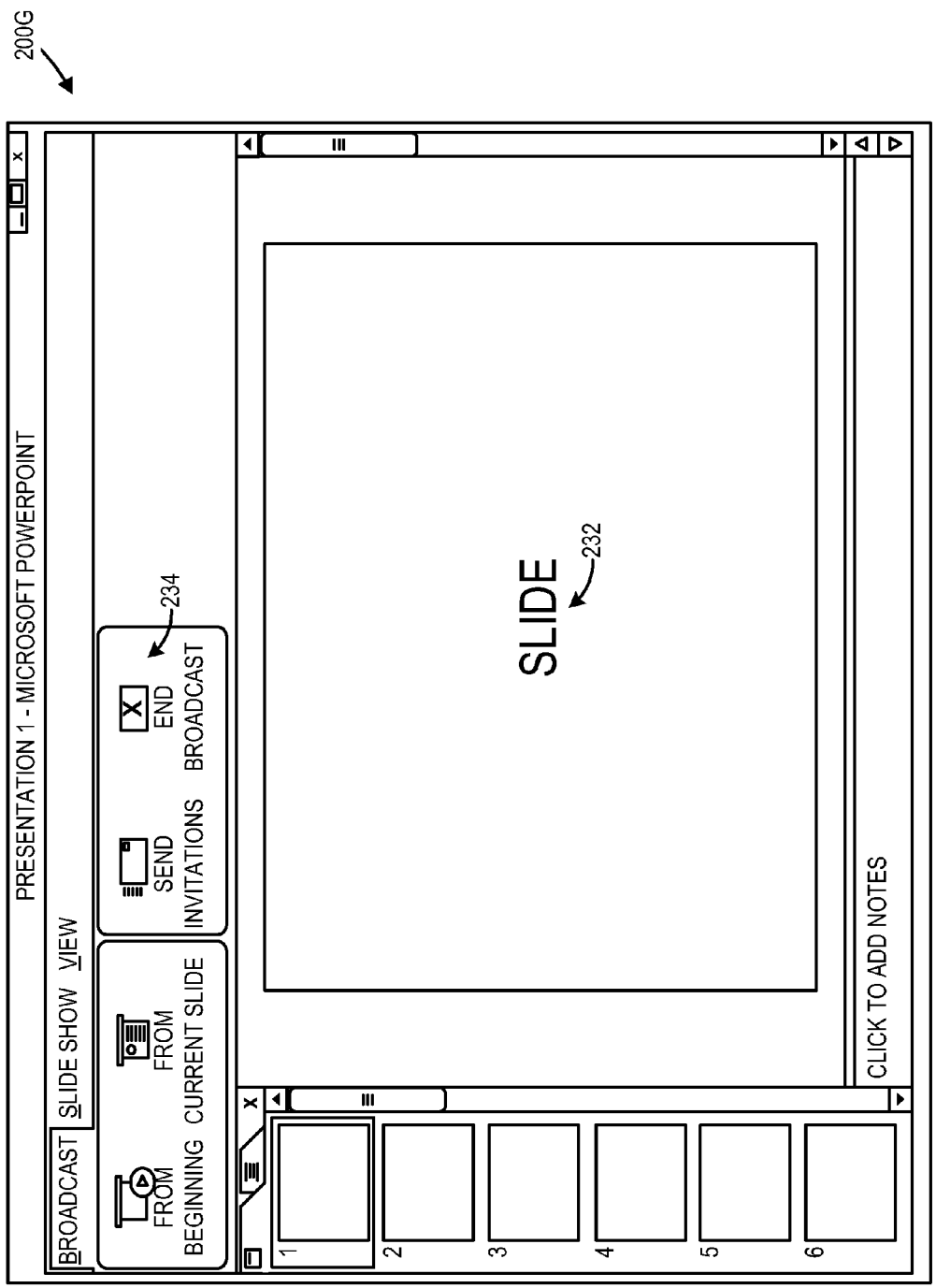

FIG. 2G shows the illustrative screen display diagram 200G of the presenting application 108 after the presenter depresses the start presentation button 230. Upon receiving a selection of the start presentation button 230, the presenting application 108 may display a first slide 232. Further, the presenting application 108 transmits to the viewing service 114 an indication that the presentation has started. As the presenter is giving the presentation through the presenting application 108, the presenting application 108 may also update the presentation state 118 in the state service 116. In one embodiment, the presenting application 108 updates the presentation state 118 each time the state of the presentation changes. In another embodiment, the presenting application 108 may update the presentation state 118 at periodic intervals.

Figure 2H:
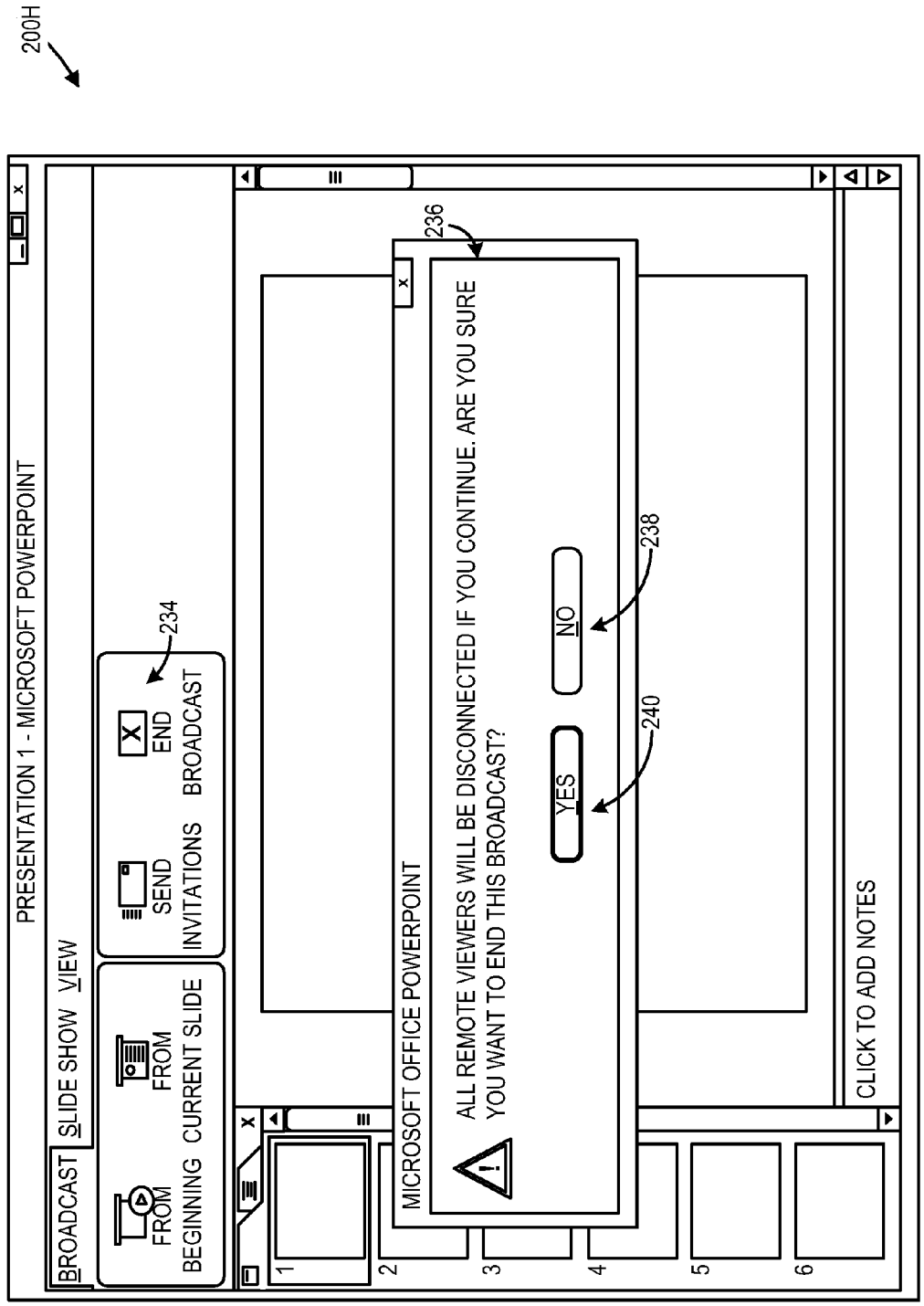

After the presenter has completed giving the presentation, the presenter may depress an end broadcast button 234, causing a transition from the screen display diagram 200G to the screen display diagram 200H. FIG. 2H shows the illustrative screen display diagram 200H of the presenting application 108 after the presenter depresses the end broadcast button 234. Upon receiving a selection of the end broadcast button 234, the presenting application 108 displays a confirmation interface 236, enabling the presenter to confirm whether he or she wants to terminate the broadcast of the presentation. The confirmation interface 236 includes a no button 238 and a yes button 240. The presenter may depress the no button 238 to indicate that she does not want to terminate the broadcast of the presentation. Alternatively, the presenter may depress the yes button 240 to indicate that she wants to terminate the broadcast of the presentation. If the presenter depresses the no button 238, then the presentation continues as shown in screen display diagram 200G of FIG. 2G. If the presenter depresses the yes button 240 then the broadcast of the presentation is terminated.

Turning now to FIGS. 3A-3D, illustrative implementations of the viewing application 112 and the second email application 120B are shown in the form of a plurality of screen display diagrams 300A-300D. In particular, the screen display diagrams 300A-300D show an illustrative sequence of attendee actions whereby the attendee can access a broadcasted presentation through the viewing application 112. It should be appreciated that FIGS. 3A-3D merely show one example of the viewing application 112 and the second email application 120B and are not intended to be limiting.

Figure 3A:
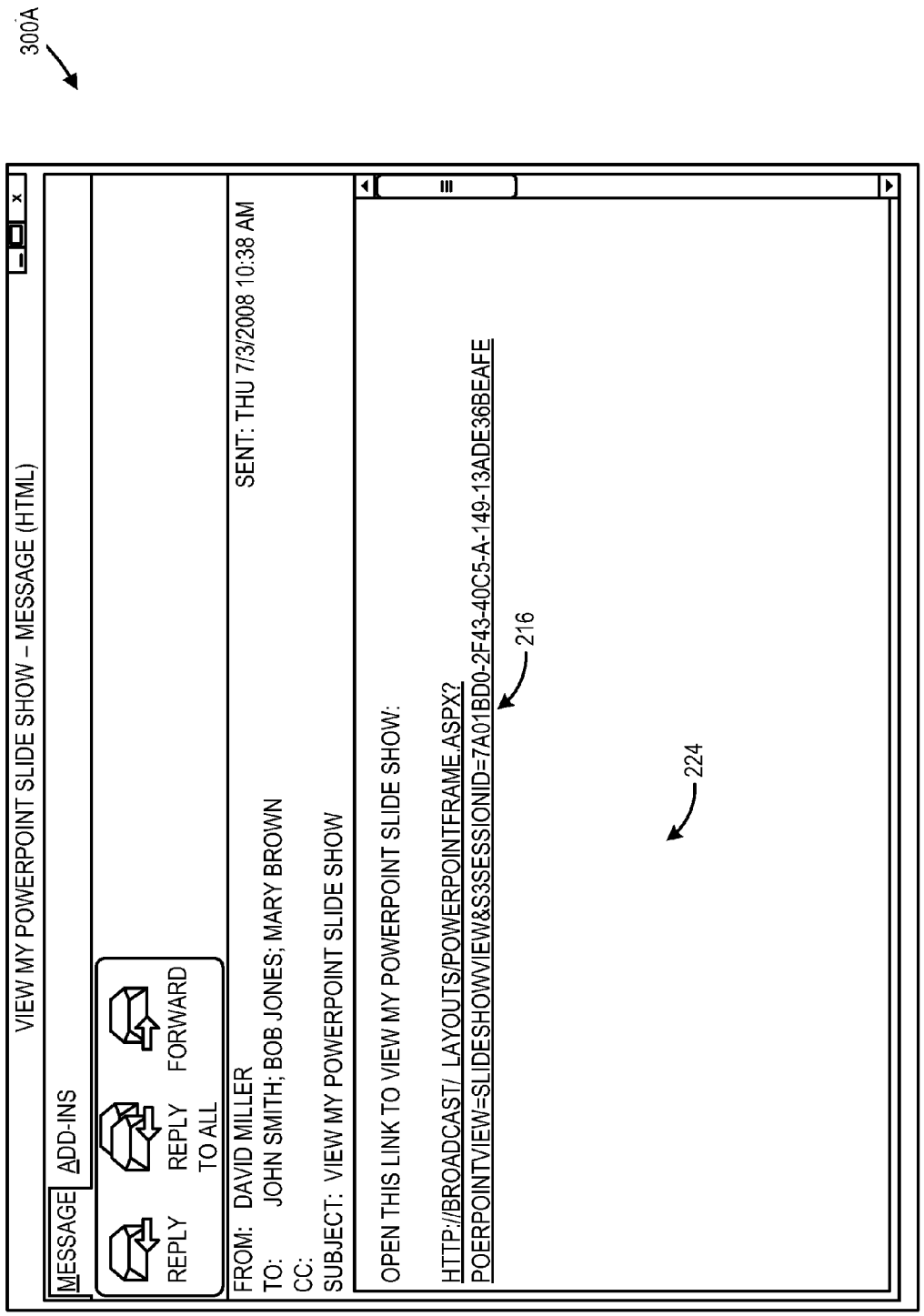
FIGS. 3A-3D are screen display diagrams showing an illustrative implementation of a viewing application.

FIG. 3A shows the illustrative screen display diagram 300 of the second email application 120B. In particular, the screen display diagram 300A shows the email 224, including the URL 216 to the presentation, sent by the presenter in the screen display diagram 200E of FIG. 2E. In the example of FIG. 3A, the attendee selects the URL 216 using a mouse or other suitable input device, thereby causing a transition from the screen display diagram 300A to the screen display diagram 300B.

Figure 3B:
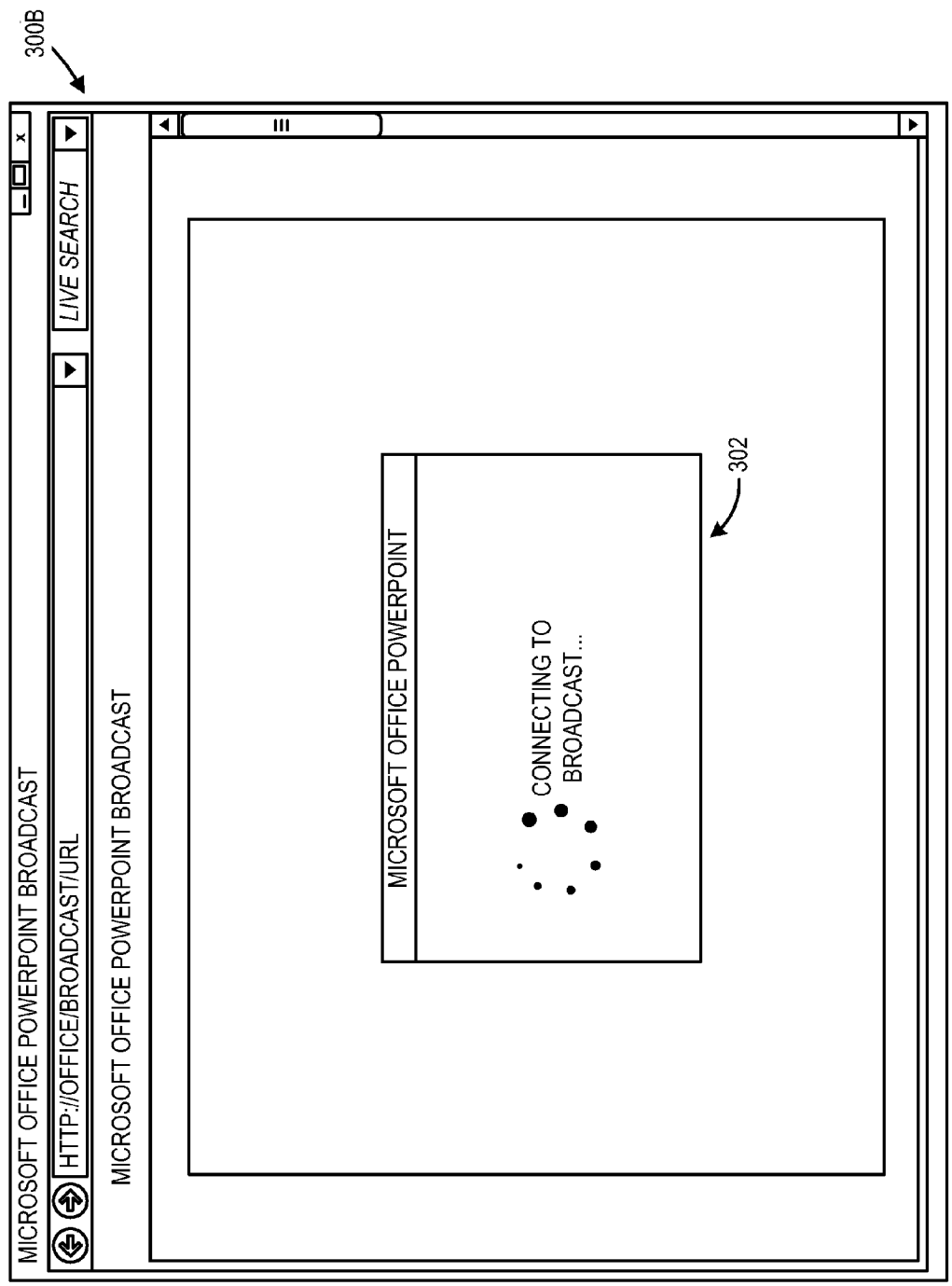

FIG. 3B shows the illustrative screen display diagram 300B of the viewing application 112 after the attendee selects the URL 216. As illustrated in the screen display diagram 300B, the viewing application 112 is initiated in response to the attendee selecting the URL 216. The viewing application 112 then displays a connection status 302. If the viewing application 112 received an indication that the presentation has started, then the viewing application 112 may immediately access the presentation. However, if the viewing application 112 has not received an indication that the presentation has started, then the viewing application 112 may display the connection status 302 until the indication is received and the presentation can be accessed. Once the viewing application 112 receives an indication that the presentation has started, the screen display diagram 300B transitions to the screen display diagram 300C.

Figure 3C:
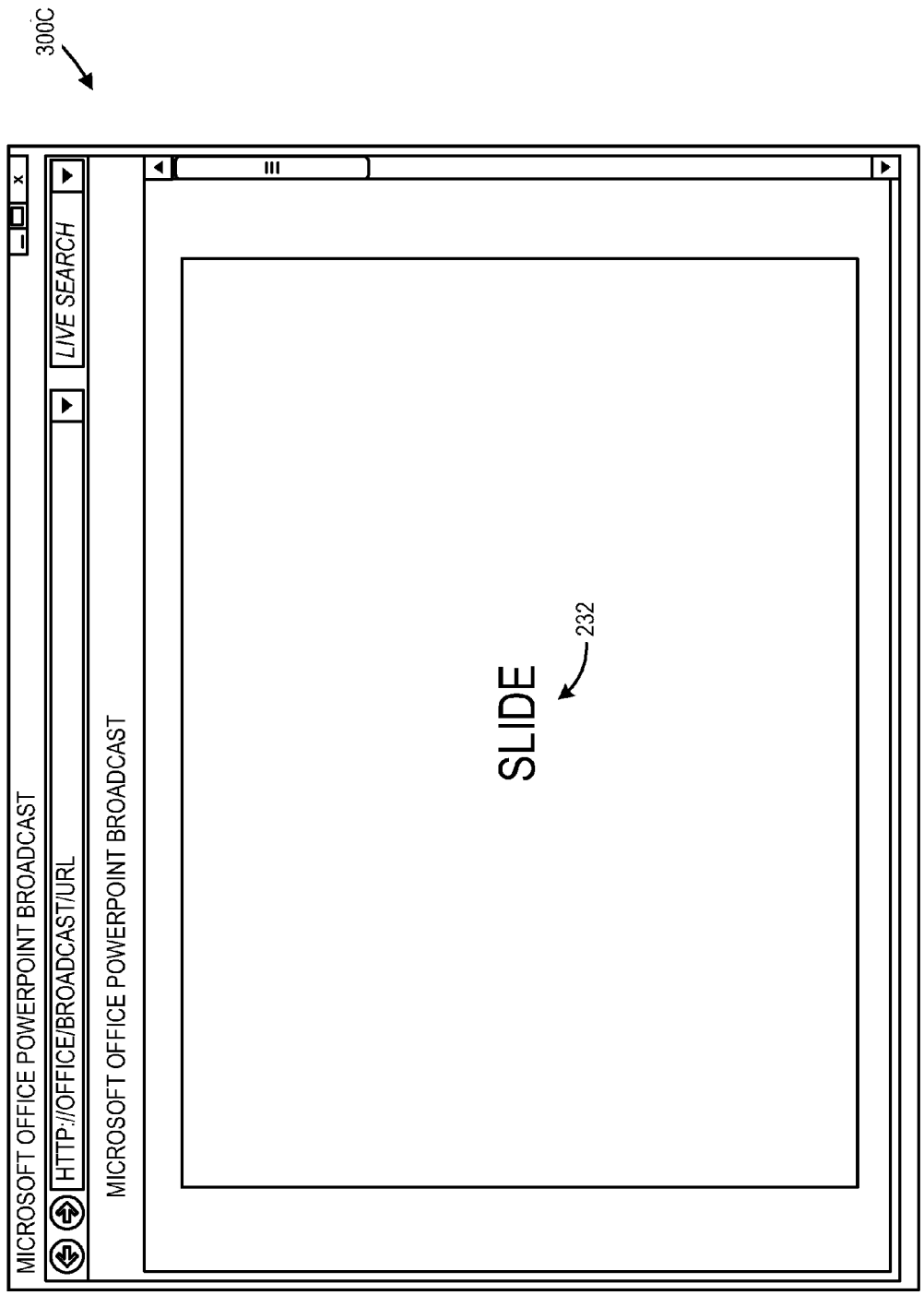

FIG. 3C shows the illustrative screen display diagram 300C of the viewing application 112 after the viewing application 112 accesses the presentation. In particular, the viewing application 112 displays the presentation as rendered by the viewing service 114. As illustrated in FIG. 3C, the viewing application 112 displays the first slide 232 that is also displayed on the screen display diagram 200G of FIG. 2G. In one embodiment, the viewing application 112 retrieves the presentation state 118 from the state service 116. The viewing application 112 then retrieves from the viewing service 114 and displays the presentation data corresponding to the presentation state 118. In another embodiment, the viewing service 114 may retrieve, at periodic intervals, the presentation state 118 from the state service 116. The viewing service 114 may synchronize its rendering of the presentation to the actual presentation given by the presenter as specified by the presentation state 118.

Figure 3D:
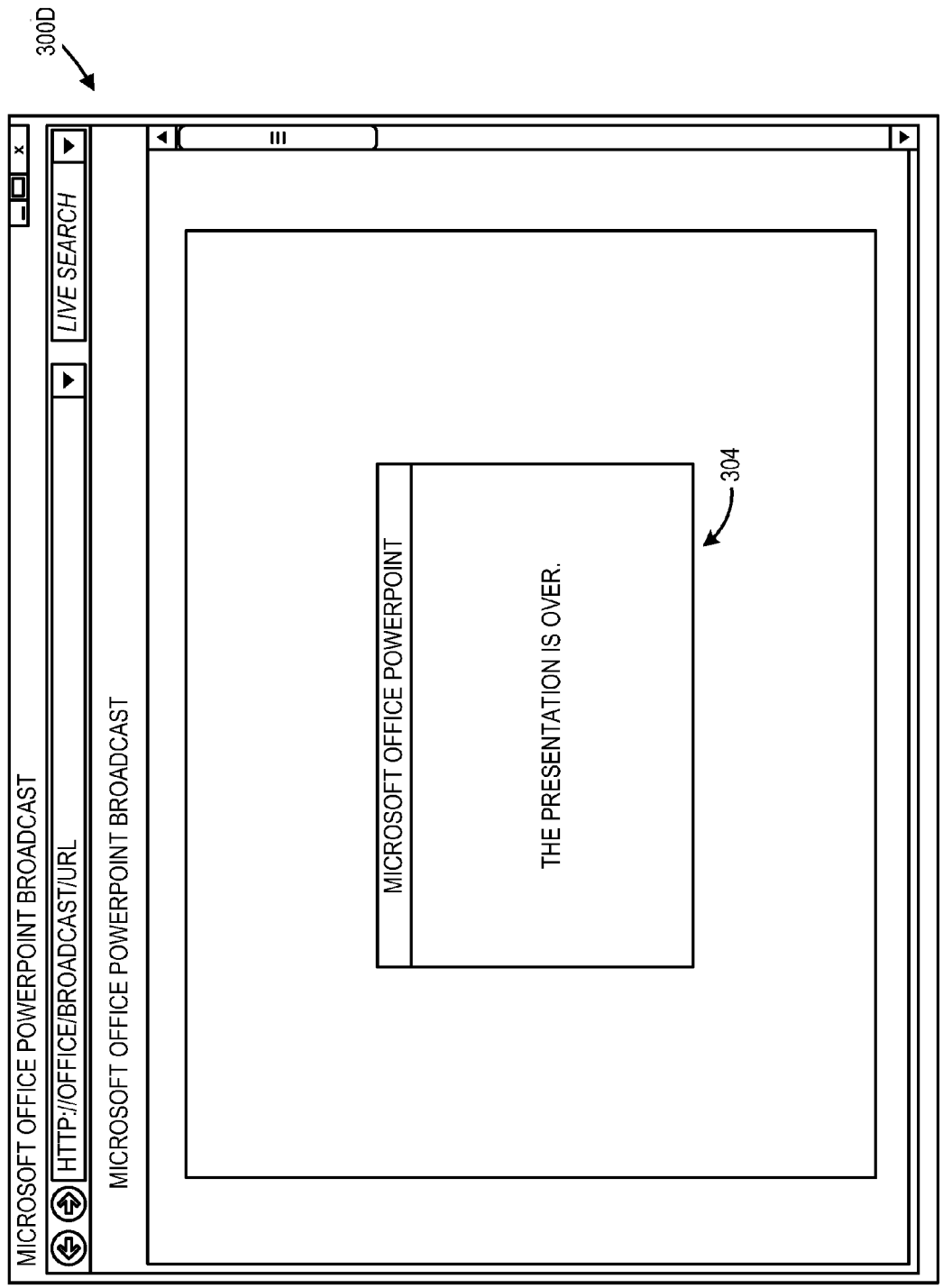

The viewing application 112 continues displaying the presentation until the presenter terminates the broadcast by depressing the yes button 240 of FIG. 2H. Upon the presenter terminating the broadcast of the presentation, the screen display diagram 300C transitions to the screen display diagram 300D. FIG. 3D shows the illustrative screen display diagram 300C of the viewing application 112 after the presenter terminates the broadcast of the presentation. As shown in FIG. 3D, the viewing service 114 renders a termination status 304 indicating that the broadcast of the presentation has been terminated.

Figure 4B:
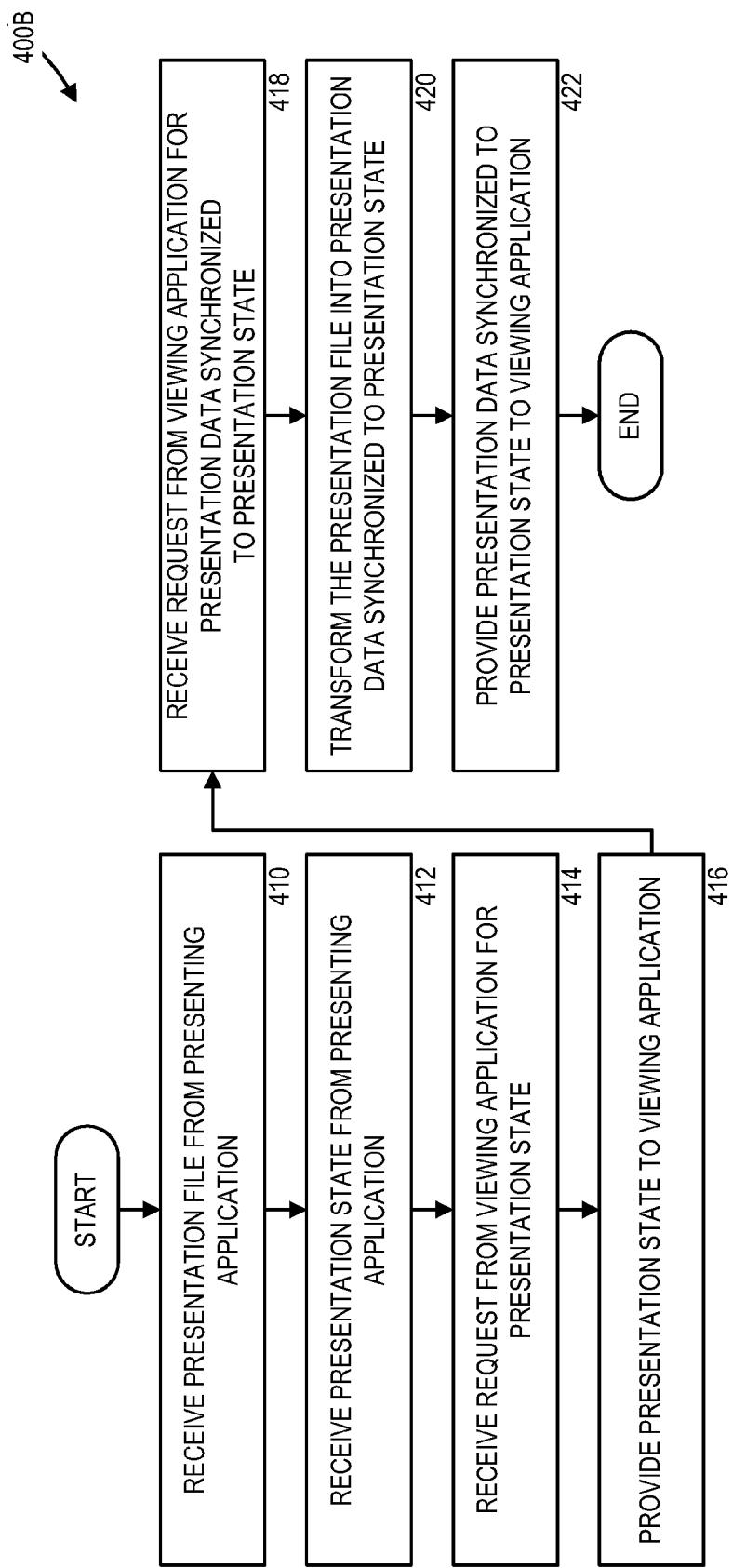

Referring now to FIGS. 4A and 4B, additional details will be provided regarding the embodiments presented herein for providing a content pane with semantic zoom. In particular, FIG. 4A is a flow diagram illustrating one method for synchronizing presentation states between multiple applications in which the viewing service 114 is configured to retrieve the presentation state 118 from the from the state service 116 and to synchronize the remote presentation with the local presentation according to the presentation state 118. FIG. 4B is a flow diagram illustrating another method of synchronizing presentation states between multiple applications in which the viewing application 112 is configured to retrieve the presentation state 118 from the state service 116 and to synchronize the remote presentation with the local presentation according to the presentation state 118.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

Referring to FIG. 4A, a routine 400A begins at operation 402, where the viewing service 114 receives the presentation file 110 from the presenting application 108 executing on the presenter device 104. The presenting application 108 may be any suitable application capable of reading the presentation file 110 and displaying a corresponding local presentation through the presenter device 104. The presentation file 110 may or may not be readable by the viewing application 112 executing on the attendee device 106. For example, the presentation file 110 may be a file generated by a presentation program, such as POWERPOINT from MICROSOFT CORPORATION or KEYNOTE from APPLE INC. If the viewing application 112 is a web browser, for example, the viewing application 112 may not be able to read the presentation file 110 because of the limited functionality of the web browser to read files from POWERPOINT or KEYNOTE. Once the state service 116 receives the presentation file 110 from the presenter device 104, the routine 400A proceeds to operation 404.

At operation 404, while the presenter is giving the local presentation, the state service 116 receives the presentation state 118 from the presenting application 108. In particular, the presenting application 108 may update the presentation state 118 when a state of the local presentation changes. Examples of the presentation state 118 include, but are not limited to, the current slide number, the current animation step, and relevant information about a laser or mouse pointer (e.g., recent coordinates traversed by the pointer, the color of the pointer, the shape of the pointer).

The routine 400A then proceeds to operation 406, where the viewing service 114 receives the presentation state 118 from the state service 116 and transforms the presentation file 110 into presentation data synchronized to the presentation state 118 to the routine 400A then proceeds to operation 408 where the viewing service 114 provides the presentation data to the viewing application 112. Upon receiving the presentation data, the viewing application 112 reads the presentation data and displays a corresponding remote presentation through the attendee device 106. The viewing service 114 may initiate providing the presentation data to the viewing application 112 in response to receiving, from presenting application 108, an indication that the local presentation has started. The viewing service 114 may also terminate providing the presentation data to the viewing application 112 in response to receiving, from the presenting application 108, an indication that the local presentation has ended. Although not so illustrated in FIG. 4A, one or more of the operations 402-408 may be repeated until the local presentation has completed.

In one example, the presentation state may be a current slide displayed in the local presentation. In this example, the viewing service 114 may synchronize a current slide of the remote presentation to the current slide of the local presentation as specified by the presentation state. In another example the presentation state 118 may be a current video frame of a video, a current audio frame of an audio recording, a video bookmark that may trigger animations, or a current animation step of an animation displayed in the local presentation. In this example, the viewing service 114 may synchronize a current video frame of the video, a current audio frame of the audio recording, a video bookmark that may trigger animations, or a current animation step of the animation displayed in the remote presentation to the current video frame of the video, the current audio frame of the audio recording, the video bookmark that may trigger animations, or the current animation step of the animation displayed in the local presentation as specified by the presentation state. In yet another example, the presentation state 118 may include recent coordinates of a mouse or laser pointer interacting with the local presentation. In this example, the viewing service 114 may display a mouse or laser pointer interacting with the remote location in accordance with the recent coordinates specified by the presentation state.

Referring to FIG. 4B, a routine 400B begins at operation 410 where the viewing service 114 receives the presentation file 110 from the presenting application 108 executing on the presenter device 104. The routine 400B then proceeds to operation 412, where the state service 116 receives the presentation state 118 from the presenting application 108. Once the viewing service 114 has received the presentation file 110 and the state service 116 has received the presentation state 118, the routine 400B proceeds to operation 414.

At operation 414, the state service 116 receives a request for the presentation state 118 from viewing application 112. The routine 400B then proceeds to operation 416 where in response to receiving the request for the presentation state 118, the state service 116 provides the presentation state 118 to the viewing application 112. The routine 400B then proceeds to operation 418 where the viewing service 114 receives a request for presentation data synchronized to the presentation state 118. Upon receiving the request for presentation data synchronized to the presentation state 118, the routine 400B proceeds to operation 420.

At operation 420, in response to receiving the request for the presentation data, the viewing service 114 transforms the presentation file 110 into presentation data synchronized to the presentation state 118. The routine 400B then proceeds to operation 422 where the viewing service 114 provides the presentation data to the viewing application 112. Upon receiving the presentation data from the viewing service 114, the viewing application 112 may read the presentation data and display the corresponding remote presentation. Although not so illustrated in FIG. 4B, one or more of the operations 410-422 may be repeated until the local presentation has completed.

Figure 5:
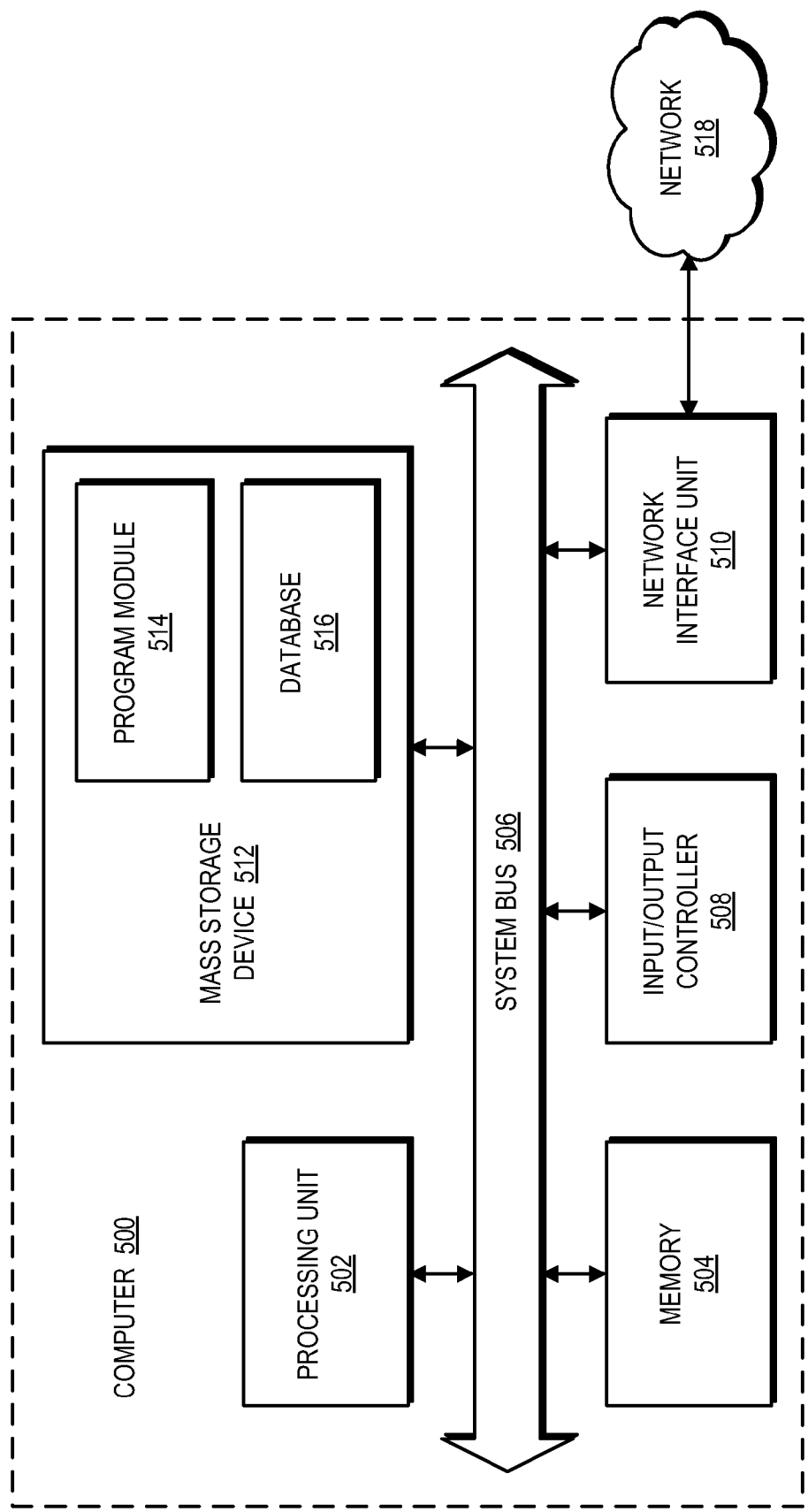
FIG. 5 is a computer architecture diagram showing an illustrative computer hardware architecture for a computing system capable of implementing the embodiments presented herein.

Referring now to FIG. 5, an exemplary computer architecture diagram showing a computer 500 is illustrated. Examples of the computer 500 may include the server computer 102, the presenter device 104, and the attendee device 106. The computer 500 includes a processing unit 502 ("CPU"), a system memory 504, and a system bus 506 that couples the memory 504 to the CPU 502. The computer 500 further includes a mass storage device 512 for storing one or more program modules 514 and one or more databases 516. Examples of the program modules 514 may include viewing service 114 and the state service 116. The routine 400 may also be embodied in a program module and executed by the computer 500. The mass storage device 512 is connected to the CPU 502 through a mass storage controller (not shown) connected to the bus 506. The mass storage device 512 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable media can be any available computer storage media that can be accessed by the computer 500.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network 518. The computer 500 may connect to the network 518 through a network interface unit 510 connected to the bus 506. It should be appreciated that the network interface unit 510 may also be utilized to connect to other types of networks and remote computer systems. The computer 500 may also include an input/output controller 508 for receiving and processing input from a number of input devices (not shown), including a keyboard, a mouse, a microphone, and a game controller. Similarly, the input/output controller 508 may provide output to a display or other type of output device (not shown).

Based on the foregoing, it should be appreciated that technologies for synchronizing presentation states between multiple applications are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for synchronizing a presentation state between a presenting application executing on a presenter device and a viewing application executing on an attendee device, the method comprising:
   receiving a presentation state from the presenting application, the presenting application operative to read a presentation file and to display a local presentation in response to reading the presentation file, the presentation state representing a current state of the local presentation;
   receiving a request for the presentation state from the viewing application; and
   in response to receiving the request for the presentation state, providing the presentation state to the viewing application, wherein when the presentation state includes a plurality of coordinate parameters, the plurality of coordinate parameters at least partly defining a path, the plurality of coordinate parameters are provided to the viewing application.

2. The computer-implemented method of claim 1, wherein the presenting application comprises a presentation program, the presentation file comprises a file generated by the presentation program, and the viewing application comprises a World Wide Web ("web") browser.

3. The computer-implemented method of claim 1, wherein the presentation state comprises a current slide of the local presentation.

4. The computer-implemented method of claim 1, further comprising providing the presentation data synchronized to the presentation state to the viewing application by providing the presentation data corresponding to the current slide of the local presentation as specified by the presentation state.

5. The computer-implemented method of claim 1, wherein the presentation state comprises a current video frame of a video, a current audio frame of an audio recording, a video bookmark, or a current animation step of an animation corresponding to the local presentation.

6. The computer-implemented method of claim 5, wherein providing the presentation data synchronized to the presentation state to the viewing application comprises providing the presentation data corresponding to the current video frame of the video, the current audio frame of the audio recording, the video bookmark, or the current animation step of the animation in the local presentation as specified by the presentation state.

7. The computer-implemented method of claim 1, wherein the presentation state comprises information about a mouse or laser pointer interacting with the local presentation.

8. The computer-implemented method of claim 7, wherein the information about the mouse or laser pointer comprises at least one of recent coordinates, a color, or a shape.

9. The computer-implemented method of claim 7, wherein providing the presentation data synchronized to the presentation state to the viewing application comprises providing the presentation data corresponding to the information about the mouse or laser pointer.

10. The computer-implemented method of claim 1, further comprising receiving the presentation file from the presenting application.

11. The computer-implemented method of claim 1, further comprising:
   receiving a request for presentation data synchronized to the presentation state from the viewing application;
   in response to receiving the request for presentation data synchronized to the presentation state, transforming the presentation file into the presentation data synchronized to the presentation state; and
   providing the presentation data synchronized to the presentation state to the viewing application, the viewing application operative to read the presentation data and to display a remote presentation in response to reading the presentation data.

12. A computer system comprising:
   a processor;
   a memory operatively coupled to the processor;
   a program module (i) which executes in the processor from the memory and (ii) which, when executed by the processor, causes the computer system to synchronize a presentation state between a presenting application executing on a presenter device and a viewing application executing on an attendee device by:
receiving a presentation state from the presenting application, the presenting application operative to read a presentation file and to display a local presentation in response to reading the presentation file, the presentation state representing a current state of the local presentation and including a plurality of coordinates recently traversed by a pointer, a shape of the pointer and a color of the pointer;
transforming the presentation file into presentation data synchronized to the presentation state; and
providing the presentation data synchronized to the presentation state to the viewing application, the viewing application operative to read the presentation data and to display the remote presentation in response to reading the presentation data.

13. The computer system of claim 12, wherein receiving a presentation state from the presenting application comprises receiving a presentation state from the presenting application while the presenting is displaying the local presentation through the presenter device.

14. The computer system of claim 12, wherein providing the presentation data synchronized to the presentation state to the viewing application comprises initiating sending the presentation data to the viewing application in response to receiving an indication that the local presentation has started.

15. The computer system of claim 14, wherein providing the presentation data synchronized to the presentation state to the viewing application further comprises terminating sending the presentation data to the viewing application in response to receiving an indication that the local presentation has ended.

16. The computer system of claim 12, wherein receiving a presentation state from the presenting application comprises receiving the presentation state from the presenting application when a state of the local presentation changes.

17. A physical computer-readable storage device storing computer-executable instructions which, when executed by a computer, cause the computer to:
receive a presentation file from a presentation program executing on a presenter device, the presentation file readable by the presentation program to display a local presentation through the presenter device, the presentation file unreadable by a viewing application executing on an attendee device, the presenter device and the attendee device operatively coupled via a network;
while the presentation program is displaying the local presentation through the presenter device, receive a presentation state from the presentation program when a state of the local presentation changes, the presentation state representing a current state of the local presentation being displayed through the presenter device, the presentation state including a coordinate parameter when a change to the state of the local presentation involves a specific coordinate of the local presentation, the specific coordinate corresponding to a position of a laser pointer input on the local presentation;
receiving a request for the presentation state from the viewing application;
in response to receiving the request for the presentation state, providing the presentation state to the viewing application;
receiving a request for presentation data synchronized to the presentation state from the viewing application;
in response to receiving the request for presentation data synchronized to the presentation state, transforming the presentation file into the presentation data synchronized to the presentation state; and
providing the presentation data synchronized to the presentation state to the viewing application, the viewing application operative to read the presentation data and to display a remote presentation in response to reading the presentation data.

18. The computer-readable storage device of claim 17, wherein the presenting application comprises a presentation program, the presentation file comprises a file generated by the presentation program, and the viewing application comprises a World Wide Web ("web") browser.

19. The computer-readable storage device of claim 17, wherein the presentation state comprises a current slide of the local presentation; and
wherein to provide the presentation data synchronized to the presentation state to the viewing application, the computer-readable medium having further computer-executable instructions stored thereon which, when executed by a computer, cause the computer to provide the presentation data synchronized to the presentation state to the viewing application comprises providing the presentation data corresponding to the current slide of the local presentation as specified by the presentation state.

20. The computer-readable storage device of claim 17, wherein the presentation state comprises a current video frame of a video, a current audio frame of an audio recording, a video bookmark, or a current animation step of an animation corresponding to the local presentation; and
wherein to provide the presentation data synchronized to the presentation state to the viewing application, the computer-readable medium having further computer-executable instructions stored thereon which, when executed by a computer, cause the computer to provide the presentation data corresponding to the current video frame of the video, the current audio frame of the audio recording, the video bookmark, or the current animation step of the animation in the local presentation as specified by the presentation state.

21. The computer-readable storage device of claim 17, wherein the presentation state comprises information about a mouse or laser pointer interacting with the local presentation; and
wherein to provide the presentation data synchronized to the presentation state to the viewing application, the computer-readable medium having further computer-executable instructions stored thereon which, when executed by a computer, cause the computer to provide the presentation data corresponding to the information about the mouse or laser pointer.

* * * * *